US011615241B2

(12) United States Patent
Agarwal et al.

(10) Patent No.: US 11,615,241 B2
(45) Date of Patent: Mar. 28, 2023

(54) METHOD AND SYSTEM FOR DETERMINING SENTIMENT OF NATURAL LANGUAGE TEXT CONTENT

(71) Applicant: Bewgle Technologies Pvt Ltd., Bangalore (IN)

(72) Inventors: Swati Agarwal, Bangalore (IN); Shantanu Shah, Bangalore (IN); Swaraj Raibagi, Bangalore (IN)

(73) Assignee: Bewgle Technologies Pvt Ltd., Bangalore (IN)

(*) Notice: Subject to any disclaimer, the term of this patent is extended or adjusted under 35 U.S.C. 154(b) by 134 days.

(21) Appl. No.: 17/200,384

(22) Filed: Mar. 12, 2021

(65) Prior Publication Data

US 2021/0312124 A1    Oct. 7, 2021

(30) Foreign Application Priority Data

Apr. 3, 2020   (IN) .............................. 202041014929

(51) Int. Cl.
*G06F 40/211*    (2020.01)
*G06Q 30/0201*   (2023.01)
(Continued)

(52) U.S. Cl.
CPC .......... *G06F 40/211* (2020.01); *G06F 16/353* (2019.01); *G06F 40/289* (2020.01); *G06Q 30/0201* (2013.01)

(58) Field of Classification Search
CPC ...... G06F 40/30; G06F 40/211; G06F 40/289; G06F 16/353; G06Q 30/0201
See application file for complete search history.

(56) References Cited

U.S. PATENT DOCUMENTS

2008/0154883 A1* 6/2008 Chowdhury .......... G06F 3/0482
707/999.005
2008/0249764 A1* 10/2008 Huang .................... G06F 40/30
704/9
(Continued)

OTHER PUBLICATIONS

Kabeer, Noor Rizvana Ahamed, et al.; "Domain-Specific Aspect-Sentiment Pair Extraction Using Rules and Compound Noun Lexicon for Customer Reviews"; Informatics 2018, 5, 45; Aug. 27, 2018; 28 pages.

(Continued)

*Primary Examiner* — Daniel C Washburn
*Assistant Examiner* — Paul J. Mueller
(74) *Attorney, Agent, or Firm* — Shackelford, Bowen, McKinley & Norton, LLP

(57) ABSTRACT

A system and method for determining sentiment of natural language text content in a domain independent manner is provided. The method comprises providing an adjective-polarity database having stored therein a list of adjectives and corresponding polarity values. The method further comprises receiving natural language text content related to a first domain with information about corresponding sentiment. The method further comprises identifying nouns and adjectives in the received tagged natural language text content. The method further comprises associating the polarity value to each of the adjectives identified in the received tagged natural language text content. The method further comprises masking the identified nouns and adjectives in the received tagged natural language text content with part-of-speech tags. The method further comprises utilizing the masked natural language text content for training of a model for determining a sentiment score for natural language text content related to a second domain.

18 Claims, 5 Drawing Sheets

(51) Int. Cl.
G06F 16/35 (2019.01)
G06F 40/289 (2020.01)

(56) References Cited

U.S. PATENT DOCUMENTS

| | | | |
|---|---|---|---|
| 2013/0091117 A1* | 4/2013 | Minh | G06F 16/353 |
| | | | 707/709 |
| 2014/0067370 A1 | 3/2014 | Brun | |
| 2020/0065716 A1* | 2/2020 | Aharonov | G06N 20/00 |
| 2020/0073902 A1* | 3/2020 | Milazzo | G06F 16/3328 |
| 2021/0200949 A1* | 7/2021 | Gao | G06F 40/279 |

OTHER PUBLICATIONS

Zafar, Lubna, et al.; "Exploiting Polarity Features for Developing Sentiment Analysis Tool"; Department of Computer Science, Faculty of Computing; Capital University of Science and Technology; Islamabad, Pakistan; Sep. 25, 2017; 15 pages.

Bagheri, Ayoub, et al.; "Care more about customers: Unsupervised domain-independent aspect detection for sentiment analysis of customer reviews"; Knowledge-Based Systems 52 (2013) 201-213; Aug. 13, 2013.

* cited by examiner

400

| Key | Value | Type |
|---|---|---|
| (1) ObjectId("5c8a59b2a878881c6a1d5ba5") | { 5 fields } | Object |
| _id | ObjectId("5c8a59b2a878881c6a1d5ba5") | ObjectId |
| score | 0.71692 | Double |
| adjective | amazing | String |
| sentiment | 5 | Int32 |
| verified | true | Boolean |
| (2) ObjectId("5c8a59b2a878881c6a1d5dc8") | { 5 fields } | Object |
| _id | ObjectId("5c8a59b2a878881c6a1d5dc8") | ObjectId |
| score | -0.46292 | Double |
| adjective | bad | String |
| sentiment | 1 | Int32 |
| verified | true | Boolean |
| (3) ObjectId("5c8a59b2a878881c6a1d7107") | { 5 fields } | Object |
| _id | ObjectId("5c8a59b2a878881c6a1d7107") | ObjectId |
| score | 0.59491 | Double |
| adjective | like | String |
| sentiment | 4 | Int32 |
| verified | true | Boolean |
| (4) ObjectId("5c8a59b2a878881c6a1d75dd") | { 5 fields } | Object |
| _id | ObjectId("5c8a59b2a878881c6a1d75dd") | ObjectId |
| score | 0.17826 | Double |
| adjective | okay | String |
| sentiment | 3 | Int32 |
| verified | true | Boolean |
| (5) ObjectId("5c8a59b2a878881c6a1d8b14") | { 5 fields } | Object |
| _id | ObjectId("5c8a59b2a878881c6a1d8b14") | ObjectId |
| score | -0.29286 | Double |
| adjective | worse | String |
| sentiment | 2 | Int32 |
| verified | true | Boolean |

FIG. 4

METHOD AND SYSTEM FOR DETERMINING SENTIMENT OF NATURAL LANGUAGE TEXT CONTENT

FIELD OF THE PRESENT DISCLOSURE

The present disclosure generally relates to natural language data processing and, more particularly, to methods and systems for determining sentiment of natural language text content in a domain independent manner.

BACKGROUND

Online mediums currently provide various forums by which individuals can provide feedback, commentary and social marking. For example, various websites provide functionality to enable users to mark an online item they like or are interested in. Further, these websites allow users to contribute a large amount of content such as user reviews for various products and services, which are recorded and stored in databases and session logs. Further, communications related to products and services may be received from users by way of social media communications, direct messages, or other feedback mechanism. All this information can be analysed to determine the performance of products and/or services as well as the performance of sellers, and further can be accessed for generating business insights and creating better advertisements and the like.

However, currently brand managers, public relations and product development teams in an organization are generally unable to comprehend the user reviews that are posted online. The primary reason for this is the sheer volume of user reviews and data about the corresponding products and services. For example, it may be appreciated that reading the reviews manually takes a long time, and further making a sense of user's sentiment in the review is difficult. Further, the user's reviews are typically aggregated as unstructured data and analytics based on such unstructured data is generally a problem, as most of the analysis models are trained on historical reviews which may not apply for future reviews. Traditional processing of the user's reviews for a product and/or a service, in some cases, is based on a star rating of a given review and a given product/service. The problem with this approach is that it ignores all the information inside the text of the review itself, which may be necessary to comprehend to understand the user's sentiment behind the user review.

Some techniques exist for determining sentiment of reviews, ranging from statistical and rule based approaches to deep learning approaches. Typical shortfalls of rule based approaches is the need for hand-crafted rules which is resource intensive; whereas the deep learning approaches could fail to catch up on trends if they are not retrained periodically. Generally, deep learning models for aspect based sentiment analysis tasks perform better when trained on a domain dependent corpus. However, this requires tagging data and training a new model for a different domain every time, and thus requires more resources and time before a model could be deployed for a new domain. Also, at times, some emerging domains might not have enough data to train the models in which case such option becomes infeasible. Researchers are trying transfer learning approach, but that also requires minimal data from the new domain.

Therefore, in light of the foregoing discussion, there exists a need to overcome problems associated with conventional natural language data processing techniques, and particularly for training of aspect based sentiment analysis model for determining sentiment for user reviews in a domain independent manner.

SUMMARY

In an aspect, a method for determining sentiment of natural language text content in a domain independent manner is provided. The method comprises providing an adjective-polarity database having stored therein a list of adjectives and a polarity value associated with each of the adjectives. The method further comprises receiving natural language text content related to a first domain with information about corresponding sentiment associated therewith. The method further comprises identifying nouns and adjectives in the received tagged natural language text content. The method further comprises associating the polarity value to each of the adjectives identified in the received tagged natural language text content based on the polarity value associated with the corresponding adjective in the adjective-polarity database. The method further comprises masking the identified nouns and adjectives in the received tagged natural language text content with part-of-speech tags based on the associated polarity values for at least the identified adjectives. The method further comprises utilizing the masked natural language text content with information about corresponding sentiment for training of an aspect based sentiment analysis model to be implemented for determining a sentiment score for natural language text content related to a second domain.

In one or more embodiments, the received tagged natural language text content comprises user reviews related to the first domain with information about corresponding one or more aspects of the first domain.

In one or more embodiments, the method further comprises categorizing each of the identified nouns in the received tagged natural language text content in a first class of nouns if the identified noun corresponds to the one or more aspects related to the first domain for which the sentiment scores are to be determined and in a second class of nouns otherwise.

In one or more embodiments, the method further comprises assigning the polarity value for at least one adjective identified in the received tagged natural language text content by: identifying at least a predefined number of other available tagged natural language text content having the same at least one adjective; determining the sentiment scores for each of the identified other available tagged natural language text content; calculating an average value of the determined sentiment scores of the identified other available tagged natural language text; and assigning the calculated average value of the sentiment scores as the polarity value for the at least one adjective.

In one or more embodiments, the method further comprises triggering a user interface to receive an input from a user to assign the polarity value for at least one adjective identified in the received tagged natural language text content.

In one or more embodiments, the adjective-polarity database comprises five categories of classes of the polarity values, with each of the adjectives in the list of adjectives stored therein being assigned to at least one of the five categories of classes of the polarity values.

In one or more embodiments, the adjectives and the corresponding polarity values in the adjective-polarity database are aspect dependent.

In one or more embodiments, the method further comprises determining and utilizing syntactic relationship between terms in the received tagged natural language text content to identify the nouns and the adjectives therein.

In one or more embodiments, the method further comprises implementing the trained aspect based sentiment analysis model to determine the sentiment score for natural language text content related to the second domain.

In another aspect, a system for determining sentiment of natural language text content in a domain independent manner is provided. The system comprises a data repository having stored therein natural language text content related to a first domain with information about corresponding sentiment associated therewith. The system also comprises an adjective-polarity database having stored therein a list of adjectives and a polarity value associated with each of the adjectives. The system further comprises a processing unit comprising an identifier module and an adjective-polarity module. The system further comprises a memory device coupled to the data repository, the adjective-polarity module and the processing unit, the memory device having instructions stored thereon that, in response to execution by the processing unit, cause the processing unit to perform operations comprising: receiving the tagged natural language text from the data repository; identifying, via the identifier module, nouns and adjectives in the received tagged natural language text content; associating, via the adjective-polarity module, the polarity value to each of the adjectives identified in the received tagged natural language text content based on the polarity value associated with the corresponding adjective in the adjective-polarity database; masking, via the identifier module, the identified nouns and adjectives in the received tagged natural language text content with part-of-speech tags based on the associated polarity values for at least the identified adjectives; and utilizing the masked natural language text content with information about corresponding sentiment for training of an aspect based sentiment analysis model to be implemented for determining a sentiment score for natural language text content related to a second domain.

In one or more embodiments, the tagged natural language text content stored in the data repository comprises user reviews related to the first domain with information about corresponding one or more aspects of the first domain.

In one or more embodiments, the processing unit is further caused to categorize, via the identifier module, each of the identified nouns in the received tagged natural language text content in a first class of nouns if the identified noun corresponds to the one or more aspects related to the first domain for which the sentiment scores are to be determined and in a second class of nouns otherwise.

In one or more embodiments, the processing unit is further configured to assign, via the adjective-polarity module, the polarity value for at least one adjective identified in the received tagged natural language text content by: identifying at least a predefined number of other available tagged natural language text content having the same at least one adjective; determining the sentiment scores for each of the identified other available tagged natural language text content; calculating an average value of the determined sentiment scores of the identified other available tagged natural language text; and assigning the calculated average value of the sentiment scores as the polarity value for the at least one adjective.

In one or more embodiments, wherein the processing unit is further configured to trigger, via the adjective-polarity module, a user interface to receive an input from a user to assign a polarity value for at least one adjective identified in the received tagged natural language text content.

In one or more embodiments, wherein the adjective-polarity database comprises five categories of classes of the polarity values, with each of the adjectives in the list of adjectives stored therein being assigned to at least one of the five categories of classes of the polarity values.

In one or more embodiments, wherein the adjectives and the corresponding polarity values in the adjective-polarity database are aspect dependent.

In one or more embodiments, wherein the processing unit is further configured to determine, via the identifier module, and utilize syntactic relationship between terms in the received tagged natural language text content to identify nouns and adjectives therein.

In one or more embodiments, wherein the processing unit is further caused to implement the trained aspect based sentiment analysis model to determine the sentiment score for natural language text content related to the second domain.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

For a more complete understanding of example embodiments of the present disclosure, reference is now made to the following descriptions taken in connection with the accompanying drawings in which:

FIG. 4 illustrates a depiction of an exemplary data table in an adjective-polarity database, in accordance with one or more exemplary embodiments of the present disclosure.

DETAILED DESCRIPTION

Figure 1:
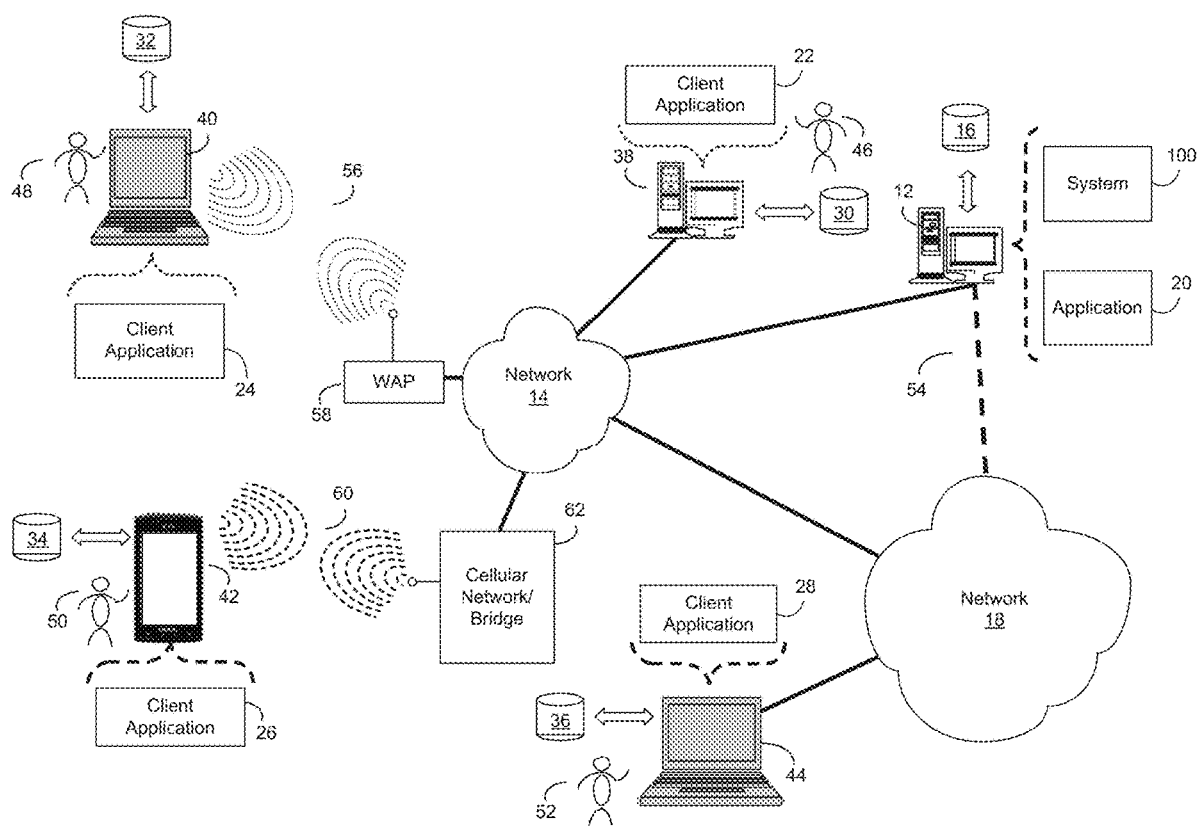
FIG. 1 illustrates a system that may reside on and may be executed by a computer, which may be connected to a network, in accordance with one or more exemplary embodiments of the present disclosure.

In the following description, for purposes of explanation, numerous specific details are set forth in order to provide a thorough understanding of the present disclosure. It will be apparent, however, to one skilled in the art that the present disclosure is not limited to these specific details.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced item. Moreover, various features are described which may be exhibited by some embodiments and not by others. Similarly, various requirements are described which may be requirements for some embodiments but not for other embodiments.

The present disclosure relates to natural language data processing and, more particularly, to methods and systems for determining sentiment of natural language text content in a domain independent manner. The present disclosure proposes a learning framework for supervised deep learning model to determine a sentiment score for user reviews. In disclosed implementations, the present disclosure may be embodied as a system, method, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product stored on a medium with computer-usable program code therein.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fibre, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electromagnetic, optical, or any suitable combination thereof. In some implementations, the computer readable program code may be transmitted using any appropriate medium, including but not limited to the internet, wireline, optical fibre cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as JavaScript, PERL, or Python. In present implementations, the used language for training may be one of Python, Tensorflow™, Bazel, C, C++. Further, decoder in user device (as will be discussed) may use C, C++ or any processor specific ISA. Furthermore, assembly code inside C/C++ may be utilized for specific operation. Also, ASR (automatic speech recognition) and G2P decoder along with entire user system can be run in embedded Linux (any distribution), Android, iOS, Windows, or the like, without any limitations. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown a system 100 that may reside on and may be executed by a computer (e.g., computer 12), which may be connected to a network (e.g., network 14) (e.g., the internet or a local area network). Examples of computer 12 may include, but are not limited to, a personal computer(s), a laptop computer(s), mobile computing device(s), a server computer, a series of server computers, a mainframe computer(s), or a computing cloud(s). In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, the instruction sets and subroutines of system 100, which may be stored on storage device, such as storage device 16, coupled to computer 12, may be executed by one or more processors (not shown) and one or more memory architectures included within computer 12. In some implementations, storage device 16 may include but is not limited to: a hard disk drive; a flash drive, a tape drive; an optical drive; a RAID array (or other array); a random access memory (RAM); and a read-only memory (ROM).

In some implementations, network 14 may be connected to one or more secondary networks (e.g., network 18), examples of which may include but are not limited to: a local area network; a wide area network; or an intranet, for example.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, system 100 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute application 20 for determining sentiment score of user-generated natural language text. In some implementations, system 100 and/or application 20 may be accessed via one or more of client applications 22, 24, 26, 28. In some implementations, system 100 may be a standalone application, or may be an applet/application/script/extension that may interact with and/or be executed within application 20, a component of application 20, and/or one or more of client applications 22, 24, 26, 28. In some implementations, application 20 may be a standalone application, or may be an applet/application/script/extension that may interact with and/or be executed within system 100, a component of system 100, and/or one or more of client applications 22, 24, 26, 28. In some implementations, one or more of client applications 22, 24, 26, 28 may be a standalone application, or may be an applet/application/script/extension that may interact with and/or be executed within and/or be a component of system 100 and/or application 20. Examples of client applications 22, 24, 26, 28 may include, but are not limited to, a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to user devices 38, 40, 42, 44, may be executed by one or more processors and one or more memory architectures incorporated into user devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of user devices 38, 40, 42, 44 (and/or computer 12) may include, but are not limited to, a personal computer (e.g., user device 38), a laptop computer (e.g., user device 40), a smart/data-enabled, cellular phone (e.g., user device 42), a notebook computer (e.g., user device 44), a tablet (not shown), a server (not shown), a television (not shown), a smart television (not shown), a media (e.g., video, photo, etc.) capturing device (not shown), and a dedicated network device (not shown). User devices 38, 40, 42, 44 may each execute an operating system, examples of which may include but are not limited to, Android®, Apple® iOS®, Mac® OS X®; Red Hat® Linux®, or a custom operating system.

In some implementations, one or more of client applications 22, 24, 26, 28 may be configured to effectuate some or all of the functionality of system 100 (and vice versa). Accordingly, in some implementations, system 100 may be a purely server-side application, a purely client-side application, or a hybrid server-side/client-side application that is cooperatively executed by one or more of client applications 22, 24, 26, 28 and/or system 100.

In some implementations, one or more of client applications 22, 24, 26, 28 may be configured to effectuate some or all of the functionality of application 20 (and vice versa). Accordingly, in some implementations, application 20 may be a purely server-side application, a purely client-side application, or a hybrid server-side/client-side application that is cooperatively executed by one or more of client applications 22, 24, 26, 28 and/or application 20. As one or more of client applications 22, 24, 26, 28, system 100, and application 20, taken singly or in any combination, may effectuate some or all of the same functionality, any description of effectuating such functionality via one or more of client applications 22, 24, 26, 28, system 100, application 20, or combination thereof, and any described interaction(s) between one or more of client applications 22, 24, 26, 28, system 100, application 20, or combination thereof to effectuate such functionality, should be taken as an example only and not to limit the scope of the disclosure.

In some implementations, one or more of users 46, 48, 50, 52 may access computer 12 and system 100 (e.g., using one or more of user devices 38, 40, 42, 44) directly through network 14 or through secondary network 18. Further, computer 12 may be connected to network 14 through secondary network 18, as illustrated with phantom link line 54. System 100 may include one or more user interfaces, such as browsers and textual or graphical user interfaces, through which users 46, 48, 50, 52 may access system 100.

In some implementations, the various user devices may be directly or indirectly coupled to network 14 (or network 18). For example, user device 38 is shown directly coupled to network 14 via a hardwired network connection. Further, user device 44 is shown directly coupled to network 18 via a hardwired network connection. User device 40 is shown wirelessly coupled to network 14 via wireless communication channel 56 established between user device 40 and wireless access point (i.e., WAP) 58, which is shown directly coupled to network 14. WAP 58 may be, for example, an IEEE 802.11a, 802.11b, 802.11g, Wi-Fi®, RFID, and/or Bluetooth™ (including Bluetooth™ Low Energy) device that is capable of establishing wireless communication channel 56 between user device 40 and WAP 58. User device 42 is shown wirelessly coupled to network 14 via wireless communication channel 60 established between user device 42 and cellular network/bridge 62, which is shown directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
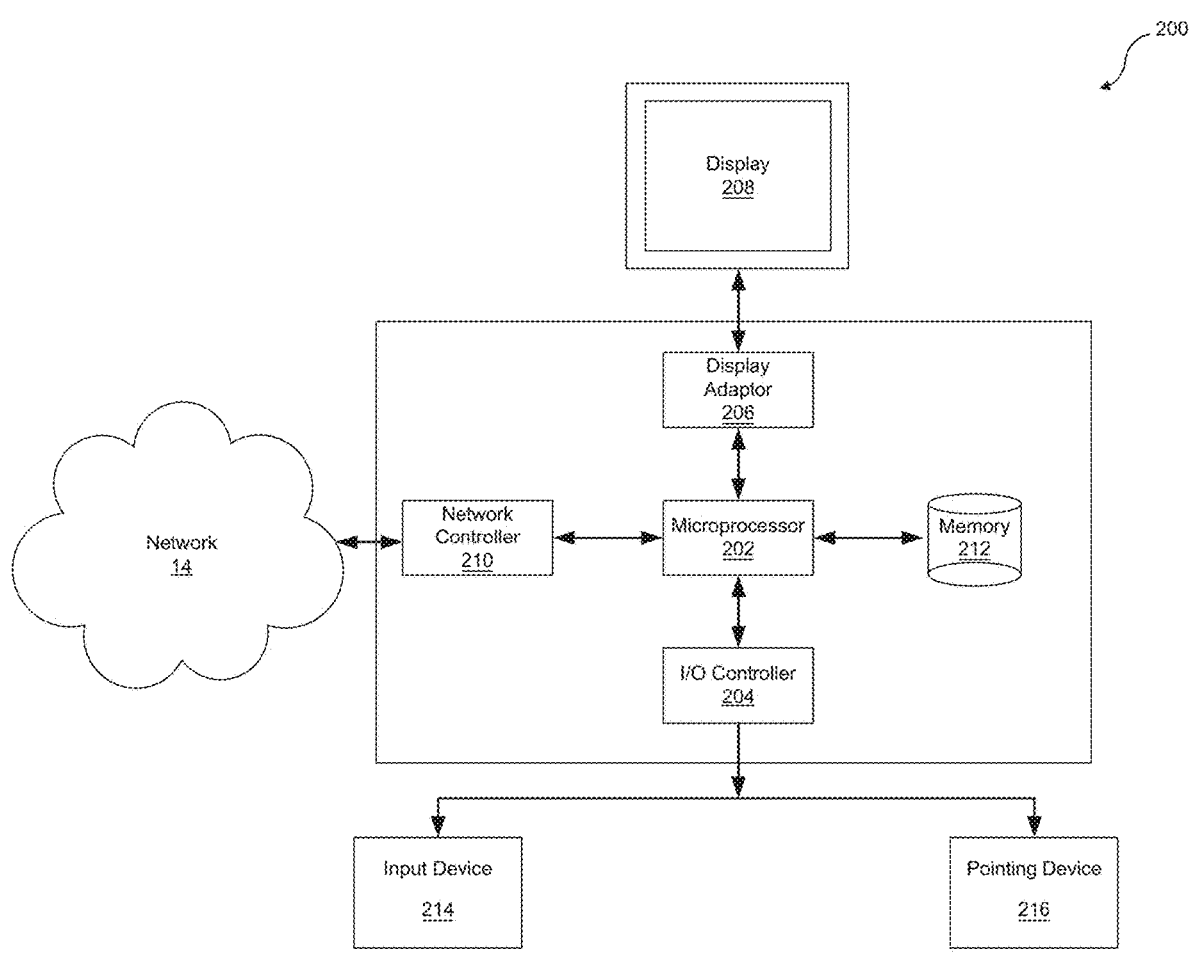
FIG. 2 illustrates a diagrammatic view of a user device, in accordance with one or more exemplary embodiments of the present disclosure.

Referring also to the example implementation of FIG. 2, there is shown a diagrammatic view of user device 200. While user device 200 is shown in this figure, this is for example purposes only and is not intended to be a limitation of this disclosure, as other configurations are possible. Additionally, any computing device capable of executing, in whole or in part, system 100 may be substituted for user device 38 (in whole or in part) within FIG. 2, examples of which may include but are not limited to computer 12 and/or one or more of user devices 38, 40, 42, 44.

In some implementations, user device 200 may include a processor and/or microprocessor (e.g., microprocessor 202) configured to, e.g., process data and execute the above-noted code/instruction sets and subroutines. Microprocessor 202 may be coupled via a storage adaptor (not shown) to the above-noted storage device(s) (e.g., storage device 30). An I/O controller (e.g., I/O controller 204) may be configured to couple microprocessor 202 with various devices, such as input device 214 (e.g., keyboard), pointing/selecting device 216 (e.g., touchpad, touchscreen, mouse, etc.), additional devices like USB ports and printer ports (not shown). A display adaptor (e.g., display adaptor 206) may be configured to couple display 208 (e.g., touchscreen monitor(s), plasma, CRT, or LCD monitor(s), etc.) with microprocessor 202, while network controller/adaptor 210 (e.g., an Ethernet adaptor) may be configured to couple microprocessor 202 to the above-noted network 14 (e.g., the Internet or a local area network). Herein, display 208 may be embodied in a Liquid Crystal Display (LCD), an Organic Light Emitting Display (OLED), or a Plasma Display Panel (PDP), and the like, and provide various display screens that can be provided through user device 200. Especially, display 208 may display a response message corresponding to the user's voice in a text or an image.

User device also includes a memory 212. Memory 212 may be a storing medium that stores the user pronunciation lexicon, which is used to perform voice recognition and may be embodied in a storage device, such as a Hard Disk Drive (HDD), and the like. For example, memory 212 may equip a ROM to store programs to perform an operation of microprocessor 202 and a RAM to store data according to an operation performance of microprocessor 202 temporarily, and the like. In addition, memory 212 may further equip Electrically Erasable and Programmable ROM (EEPROM) to store various reference data.

Figure 3:
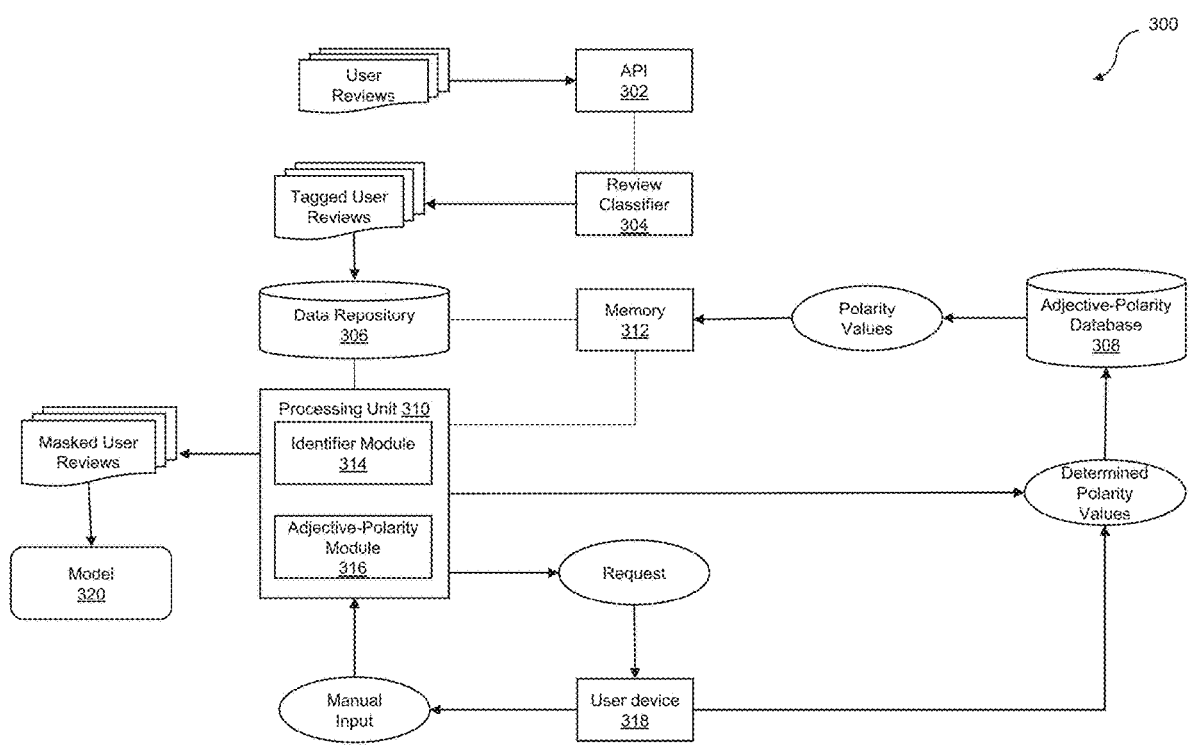
FIG. 3 illustrates a block diagram of a system for determining sentiment of natural language text content, in accordance with one or more exemplary embodiments of the present disclosure.

Referring now to FIG. 3, there is shown a block diagram of a system 300 for determining sentiment of natural language text content in a domain independent manner, in accordance with one or more exemplary embodiments of the present disclosure. The present system 300 provides a learning framework for supervised deep learning model to determine a sentiment score for user reviews. In particular, the present system 300 provides means to train a model, such as an aspect based sentiment analysis model (as known in the art) for determining a sentiment score for natural language text content. In particular, in the present embodiments, the said aspect based sentiment analysis model is trained on natural language text content related to a first domain and implemented for determining a sentiment score for natural language text content related to a second domain.

According to some embodiments, the system 300 can be implemented by a server, or a combination of servers. However, other non-server computing environments can alternatively be used. For example, the system 300 may be implemented on a single user terminal, or in a networked environment of shared resources where individual computers communicate by way of, for example, client/server or peer to peer connections, as discussed in reference to FIG. 1. In some implementations, the present system 300 may be implemented as a service. In particular, the system 300 may include a programmatic interface to respond to function call requests from other applications or sites that specify text content. The system 300 includes programmatic components for performing functions that operate on the text, including functions for tokenizing the text content, analysing the grammatical structure of the text, and identifying subject from the text, as discussed in more detail in the proceeding paragraphs.

As illustrated in FIG. 3, the system 300 may include an application programming interface (API) 302. The API 302 may be disposed in communication with an external server arrangement (not shown) to receive corpus of user-generated natural language text content therefrom. It may be appreciated that the API 302 may be in communication with corresponding API of the external server arrangement to access the user-generated natural language text content stored therein. Herein, the natural language text content may be in the form of, for example, user reviews of business establishments and products, social networking content, commentary, and/or blog entries. Alternatively, the text content may be generated or retrieved on the fly by a retrieval or submission process. In the present examples, the user-generated natural language text content includes user reviews which may have been posted online, for example, on an e-commerce portal or the like, associated with the external server arrangement.

As used herein, a "user review" may refer to text of any length that is authored by one or more users to communicate the one or more users' opinions about one or more entities. The user review may include one or more text strings (e.g., complete sentences, ending with a period, exclamation, or question mark, or shorter text strings, such as phrases, or the like) in a natural language, such as English, which has its own grammar. In general, the user is instructed to provide a comment on the topic which is the subject of the review, but is generally free to enter any text whatsoever which fits within the field. The text may include one or more terms, such as words or phrases, which appear in the vocabulary. The text may further include one or more expressions. In various implementations, user reviews may be gathered from one or more of blog or social network postings, emails, articles written for websites or for printed publications such as magazines or newspapers, postings made to a user review section of an online vendor or marketplace, or even user reviews submitted to various existing user review clearinghouses. The user review may include comments about one or more aspects of the product and/or service to which the user review pertains. In the present embodiments, the aspects associated with a user review may be any one of features, components, specification, properties, etc. of the product and/or service to which the user review pertains. For example, in a user review of a smartphone, the aspects may include screen, processor, speakers, camera, software, user interface, etc.

It may be appreciated that although the present disclosure has been explained in terms of the natural language text content being user reviews for determining sentiment thereof; herein, the natural language text content may be any corpus of user content without any limitations. Further, it may be appreciated that although the present disclosure has been explained in terms of user content being in textual form; in alternative examples, the user content may be in speech form which may be converted into textual form using speech recognition engine or the like as known in the art, without any limitations. Herein afterwards, the terms "natural language text content", "user-generated text content", "text content", "user reviews" have been used interchangeably for the purposes of the present disclosure.

As will be appreciated, the user reviews may assume a variety of formats, depending on the template provided by the online portal, and may be submitted electronically to the online portal. The system 300 includes a review classifier 304 to convert the received user reviews to a suitable format for processing, such as an XML format, in which the relevant fields of the user reviews are identified with XML tags. Generally, the online portal provides a review template which specifies a topic, such as a product review, and the reviewer may enter the name of the product, if not included on the template. The template may also include a rating field where a reviewer supplies an overall rating of the reviewed topic, which is an explicit expression of the reviewer's opinion of the topic. In an example, the reviewer may allocate a number of stars, 0 being worst and 5 being best. The review classifier 304 may aggregate all the information associated with the user review and provide tagged user review containing information about corresponding sentiment and one or more aspects associated therewith. As will be appreciated, any quantitative or qualitative rating scheme may be used from which the review classifier 304 extracts a sentiment of the user review. For instance, in one example, the review classifier 304 of the system 300 would extract a quantized overall rating of 1 and consign the review to the set of very negative reviews with that overall rating. Alternatively, as will be appreciated, the API 302 of the system 300 may receive tagged user reviews at first place from the external server arrangement and the review classifier 304 may not be needed, where such tagged reviews may be generated by any known means in the art, such as manual tagging.

Further, as illustrated, the system 300 incudes a data repository 306. The term "data repository" as used herein refers to data sources that may contain unstructured or structured data, such as databases, file systems, search engine indexes, or the like. In at least one of the various embodiments, data repository may be a live stream of data. In other cases, data repository may be static data, or combination of live data or static data. In at least one of the various embodiments, data repositories may provide interfaces and/or application programming interfaces (API) for receiving requests, queries, or searches regarding the data stored in the data repository. The data repository 306 is configured to store the tagged user-generated natural language text content (or tagged user reviews) therein for later retrieval. For this purposes, the data repository 306 may be disposed in communication with the review classifier 304 or directly with the API 302, as required for receiving the tagged user reviews. In the present embodiments, the data repository 306 have stored therein tagged natural language text content related to a first domain with information about corresponding sentiment associated therewith as well as information about corresponding one or more aspects of the first domain.

According to embodiments of the present disclosure, the system 300 includes an adjective-polarity database 308. The term "database" as used herein refers to an organized body of digital information regardless of the manner in which the data or the organized body thereof is represented. Optionally, the adjective-polarity database 308 may be hardware, software, firmware and/or any combination thereof. For example, the organized body of related data may be in the form of a table, a map, a grid, a packet, a datagram, a file, a document, a list or in any other form. The adjective-polarity database 308 includes any data storage software and systems, such as, for example, a relational database like IBM DB2 and Oracle 9. Optionally, the adjective-polarity database 308 may be used interchangeably herein as database management system, as is common in the art. Furthermore, the database management system refers to the software program for creating and managing one or more databases. Optionally, the adjective-polarity database 308 may be operable to support relational operations, regardless of whether it enforces strict adherence to the relational model, as understood by those of ordinary skill in the art. Additionally, the information is stored in the cells of the adjective-polarity database 308.

The adjective-polarity database 308 have stored therein a list of adjectives and a polarity value associated with each of the adjectives. FIG. 4 illustrates an exemplary data table 400 of the adjective-polarity database 308 with the list of adjectives and corresponding polarity value assigned thereto. The data table 400 may provide an "object ID" to each of the adjectives, information about whether the assigned polarity value to the listed adjective is verified or not. Such data table may be contemplated by a person skilled in the art of database management and thus has not been described herein for the brevity of the present disclosure. In the present embodiments, the adjective-polarity database 308 comprises five categories of classes of the polarity values, with each of the adjectives in the list of adjectives stored therein being assigned to at least one of the five categories of classes of the polarity values. In one example, the five categories of classes of the polarity values may include "Very Positive" (which is assigned a polarity value of 5), "Positive" (which is assigned a polarity value of 4), "Neutral" (which is assigned a polarity value of 3), "Negative" (which is assigned a polarity value of 2), and "Very Negative" (which is assigned a polarity value of 1). Broadly, herein, polarity pertains to a measure of a sentiment, e.g., a positive sentiment, a negative sentiment, and/or a neutral sentiment. It should be noted that there are many ways to express various degrees of sentiments in addition to "positive", "negative", and "neutral", e.g., "favorable", "unfavorable", "for", "against", "do not care", and so on. As will be discussed below, a sentiment model will be created to determine a sentiment of user reviews by training of a machine learning tool based upon a corpus of tagged user reviews with the adjectives therein replaced by their polarity values.

In an embodiment, the adjectives and the corresponding polarity values in the adjective-polarity database 308 are aspect dependent. An "aspect," as used herein, is a word or sequence of words which names a particular aspect of a target entity in the domain of interest. That is, the adjective-polarity database 308 is built by detecting the main aspects (features) of the item and to estimate the polarity expressed about these aspects (usually positive, negative, and neutral). The detection of aspects entails detecting the aspect terms common to the particular domain and then associating them with semantic categories (or topics). For example, given a restaurant review "The pizza was delicious, but service was slow," the aim would be to identify the different aspects that relate to the restaurant domain (pizza and service) about which an opinion is expressed (positive and negative, respectively), assign these terms to semantic categories (e.g., food and service), and associate them with a measure of polarity. In another example, the word "small" can indicate both a positive (such as, small commute time) or a negative (such as, small portion size) opinion on a product feature depending on the product and the context. The present adjective-polarity database 308 with the list of adjective may consider the aspect for assigning the polarity value to a given adjective therein.

Referring back to FIG. 3, as illustrated, the system 300 includes a processing unit 310 and a memory device 312. The processing unit 310 may include any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit. Further, the memory device 312 may be implemented as random access memory and/or read-only memory. The memory device 312 is coupled to the data repository 306, the adjective-polarity module 308 and the processing unit 310. The memory device 312 have instructions stored thereon that, in response to execution by the processing unit 310, cause the processing unit 310 to perform various operations, as discussed in the proceeding paragraphs. Possible configurations and arrangement(s) for the processing unit 310 and the memory device 312 for the purposes of the present disclosure has been described in reference to FIGS. 1 and 2, and thus have not been repeated herein.

Herein after, as used herein, for the purposes of the present disclosure, the term "module" includes an identifiable portion of computer code, computational or executable instructions, data, or computational object to achieve a particular function, operation, processing, or procedure. A module may be implemented in software, hardware/circuitry, or a combination of software and hardware. An identified module of executable code, for example, may comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Indeed, a module of executable code could be a single instruction, or many instructions, and may even be distributed over several different code segments, among different programs, and across several memory devices. Similarly, modules representing data may be embodied in any suitable form and organized within any suitable type of data structure. The data may be collected as a single data set, or may be distributed over different locations including over different storage devices.

In an embodiment of the present disclosure, the processing unit 310 includes an identifier module 314. The processing unit 310 is configured to determine, via the identifier module 314, syntactic relationship between terms in the received tagged natural language text content. Further, the processing unit 310 is configured to identify, via the identifier module 314, nouns and adjectives in the received tagged natural language text content utilizing the determined syntactic relationship between terms in the received tagged natural language text content. For instance, an expression found in natural language text content is considered as an instance of a pattern if its (normalized) terms are in a syntactic relationship of the type prescribed by the pattern, such as a NOUN-ADJECTIVE (modifier or attribute) relation. A contextual rule for assigning a polarity to expressions specifies a polarity which is to be assigned to an expression which is an instance of a given pattern. As an example, only NOUN-ADJECTIVE expressions are considered, where the adjective (ambiguous term) is qualifying the noun (supporting term). Here, both single nouns and noun phrases are considered as the supporting term. These expressions are generally of two types: in the first, the adjective serves as a modifier for the noun and in the second, the adjective serves as an attribute of the noun. Modifiers, in English, are adjectives that can appear before a noun as part of a noun phrase, placed after determiners or numbers if there are any, and immediately before the noun, and are in a modifier relationship, i.e., they modify the noun. In French, they can appear after the noun. So it may be contemplated by using the described methodology, nouns and adjectives in the received tagged natural language text content may be identified. It should be understood that nouns and adjectives are typically domain dependent in the received tagged natural language text content (e.g., user reviews or the like), and thus provide context for using of the natural language text content related to a first domain for training of an aspect based sentiment analysis model to be implemented for determining a sentiment score for natural language text content related to a second domain, and thus are identified for the purposes of the present disclosure.

In one or more embodiments, the processing unit 310 is further caused to categorize, via the identifier module 314, each of the identified nouns in the received tagged natural language text content. The identified nouns are categorized in a first class of nouns if the identified noun corresponds to the one or more aspects related to the first domain (from the received tagged natural language text content, that is user reviews) for which the sentiment scores are to be determined and in a second class of nouns otherwise. In an example, for a user review related to a "smartphone" mentioning about its "camera" and "price," if the sentiment score is to be determined for the "camera" of the "smartphone," the term "camera" would be considered as the first class of noun and the term "price" would be considered as second class of noun; and vice-versa in case of the sentiment score is to be determined for the "price" of the "smartphone." Such categorization of nouns in the received tagged natural language text content may be implemented for better training of the aspect based sentiment analysis model for determining the sentiment for natural language text content related to a second domain (i.e. other domain different from the first domain), as will be discussed later in the description.

In an embodiment of the present disclosure, the processing unit 310 also includes an adjective-polarity module 316. The adjective-polarity module 316 is configured to associate the polarity value to each of the adjectives identified in the received tagged natural language text content based on the polarity value associated with the corresponding adjective in the adjective-polarity database 308.

In an embodiment, in case a given adjective may not be listed (or present) or the corresponding polarity value for a given adjective is not provided (or missing) in the adjective-polarity database 308, the adjective-polarity module 316 may configure the processing unit 310 to automatically detect the polarity value of the given adjective. The processing unit is further configured to assign, via the adjective-polarity module 316, the polarity value for at least one adjective identified in the received tagged natural language text content by first identifying at least a predefined number of other available tagged natural language text content having the same at least one adjective. Herein, the predefined number may be a minimum number of user reviews having a given adjective, considered to determine the polarity value for the given adjective. In one example, the predefined number of other available tagged natural language text content having the same at least one adjective may be in the range of 500 to 2000. In a preferred example, the predefined number of other available tagged natural language text content having the same at least one adjective may be 1000. Then, the sentiment scores for each of the identified other available tagged natural language text content are identified. Thereafter, an average value of the determined sentiment scores of the identified other available tagged natural language text is determined. The calculated average value of the sentiment scores is assigned as the polarity value for the at least one adjective Further, in an embodiment, in case there may not be predefined (sufficient or minimum) number of other available tagged natural language text content having the same at least one adjective being available, the processing unit 310 is further configured to trigger, via the adjective-polarity module 316, a user interface to receive an input from a user to assign a polarity value for at least one adjective identified in the received tagged natural language text content. That is, as schematically depicted in FIG. 3, the adjective-polarity module 316 may configure the processing unit 310 to trigger the user interface to request a user to manually input a polarity value for the given adjective. The user interface, as used herein, may be provided by a user device, such as the user device 318 as shown in FIG. 3. It may be appreciated that the user device 318 may be any of the user devices 38, 40, 42, 44, examples and details of which are provided in reference to FIGS. 1-2. Also, it may be appreciated that a user (e.g. a human operator) may be able to provide the manual input via an input device 214 (e.g., keyboard) and/or pointing/selecting device 216 (e.g., touchpad, touchscreen, mouse, etc.) associated with the user device 318, and examples and details of which are provided in reference to FIGS. 1-2. Herein, a user may provide the manual input as a numerical input to assign the polarity value for the given adjective. For example, for a given adjective like "fabulous", the user may provide a manual input in the form of numerical value "5" which get associated as polarity value "5" for the given adjective, in the context of embodiments of the present disclosure.

In some examples, as may also be seen from FIG. 3, the adjective-polarity database 308 is coupled to the processing unit 310 and the user device 318. Thereby, the determined polarity values (calculated or via manual input) may be fed back to the adjective-polarity database 308 for storing therein. That is, the determined polarity values for the given adjectives (which were not present in the adjective-polarity database 308) are added thereto for future reference.

In an embodiment, the processing unit 310 is further caused to mask, via the identifier module 314, the identified nouns and adjectives in the received tagged natural language text content with part-of-speech (POS) tags based on the associated polarity values for at least the identified adjectives. That is, the identified nouns and adjectives in the received tagged natural language text content are replaced with POS tags. The function of POS tags is to associate each word or corresponding sub-unit in a text with an abstract morpho-syntactic category being represented by a tag. POS-tagged text is used in a variety of text manipulation processes, for example in a parser or syntactical analyser allowing the recognition, extraction and normalization of semantic structures in the text. These structures may be used for text mining, indexing, understanding, and dialog systems. In the present examples, based on the polarity of 1 to 5, each of the identified adjective gets masked as either of "ADJ1", "ADJ2", "ADJ3", "ADJ4", and "ADJ5", respectively. As discussed, each of the identified nouns in the received tagged natural language text content are categorized in the first class of nouns if the identified noun corresponds to the one or more aspects related to the first domain for which the sentiment scores are to be determined and in the second class of nouns otherwise. It should be understood that the nouns categorized under the first class of nouns are masked differently than nouns categorized under the second class of nouns.

The system 300 of the present disclosure utilizes the masked natural language text content with information about corresponding sentiment for training of an aspect based sentiment analysis model 320 (as depicted in FIG. 3). That is, the tagged natural language text content with the identified nouns and adjectives replaced with part-of-speech (POS) tags are utilized for training of the aspect based sentiment analysis model 320. Herein, the trained aspect based sentiment analysis model 320 is implemented for determining a sentiment score for natural language text content related to the second domain (i.e. a domain different than the first domain on which the model is trained). Herein, the processing unit 310 is further caused to implement the trained aspect based sentiment analysis model 320 to determine the sentiment score for natural language text content related to the second domain. This makes the system 300 of the present disclosure capable of determining sentiment of natural language text content in a domain independent manner. It may be appreciated that the determined sentiment score may be in the form of probabilities of different sentiments for a given user review. For example, for a given user review related to a second domain, the determined sentiment score may be 85% positive, 12% neutral and 3% negative, or the like. The implementation of aspect based sentiment analysis models for determining sentiment scores for user-generated natural language text content (e.g. user reviews) is well known in the art and thus has not been described herein for the brevity of the present disclosure.

In one embodiment, the machine learning tool is trained to generate the aspect based sentiment analysis model that determines a sentiment of user reviews based upon the abstraction. For example, a large sample of abstractions of user reviews with predetermined subjectivity classifications and sentiments is used to train the machine learning tool. The machine learning tool may "learn" which abstractions are subjective and lead to which sentiments based upon the large sample. In one or more examples, the implemented aspect based sentiment analysis model is a Long short-term memory (LS™) which is an artificial recurrent neural network (RNN) architecture used in the field of deep learning. Unlike standard feedforward neural networks, LS™ has feedback connections, and can not only process single data points, but also entire sequences of data.

It may be appreciated that the basic idea behind implementation of the aspect based sentiment analysis model is the ability to determine sentiments or opinions that are expressed regarding different features or aspects of entities. When a text is classified at a sentence level, the resulting classification might not provide meaningful data concerning what the opinion holder likes or dislikes. If a sentence is positive on an object, for example, this clearly does not mean that the opinion holder will hold positive opinions about all the aspects or features of the object. Similarly, if a sentence is negative it does not mean that the opinion holder will dislike everything about the object described. The disclosed techniques for training, and subsequent implementation of the aspect based sentiment analysis model allows to determine sentiment values for different aspects present in a user review related to a domain.

Figure 5:
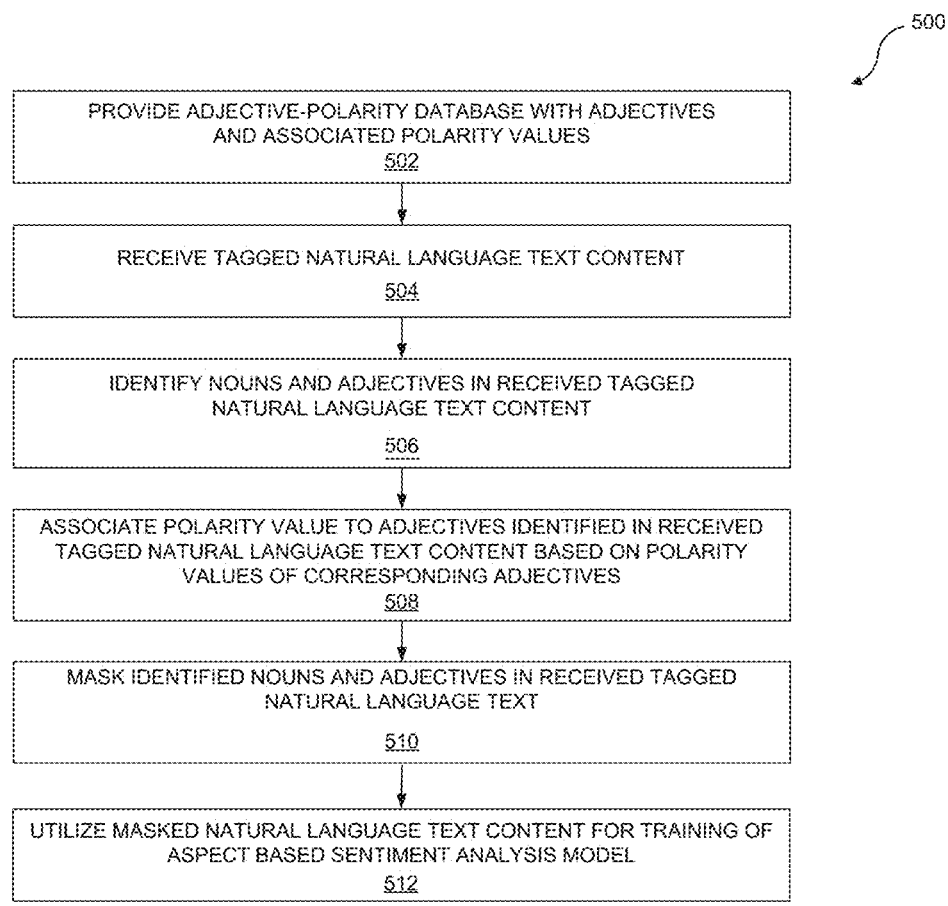
FIG. 5 illustrates a flowchart depicting steps involved in a method for determining sentiment of natural language text content, in accordance with one or more exemplary embodiments of the present disclosure.

FIG. 5 illustrates a flowchart 500 depicting steps involved in a method for determining sentiment of natural language text content, in accordance with one or more exemplary embodiments of the present disclosure. At a step 502, the method includes providing an adjective-polarity database (such as, the adjective-polarity database 308) having stored therein a list of adjectives and a polarity value associated with each of the adjectives. At a step 504, the method includes receiving (e.g., via the data repository 306) tagged natural language text content related to a first domain with information about corresponding sentiment associated therewith. At a step 506, the method includes identifying (e.g., via the identifier module 314) nouns and adjectives in the received tagged natural language text content. At a step 508, the method includes associating (e.g., via the adjective-polarity module 316) the polarity value to each of the adjectives identified in the received tagged natural language text content based on the polarity value associated with the corresponding adjective in the adjective-polarity database 308. At a step 510, the method includes masking (e.g., via the identifier module 314) the identified nouns and adjectives in the received tagged natural language text content with part-of-speech tags based on the associated polarity values for at least the identified adjectives. At a step 512, the method includes utilizing the masked natural language text content with information about corresponding sentiment for training of an aspect based sentiment analysis model to be implemented for determining a sentiment score for natural language text content related to a second domain.

The systems and methods of the present disclosure resolves the issue of requiring a new model for determining sentiment of natural language text content for every domain by masking the domain specific words. It has been found that mostly nouns and adjectives form the domain dependent words in a corpus. The general idea behind the systems and methods of the present disclosure is masking of nouns and adjectives which primarily make up domain dependent words in reviews by POS Tags. Further, the adjectives are divided into 5 classes of Very Positive, Positive, Neutral, Negative, Very Negative, and the class number is attached to the POS tag for adjective. Therefrom, the model (such as, the model 320) for aspect based sentiment analysis is trained post masking of this data which can be used across domains. The main motivation behind the systems and methods of the present disclosure is avoiding the need to build new models for every new domain which reduces the time and effort to support a new domain. It especially helps when there is not much data available for training models for a new domain.

The systems and methods of the present disclosure finds applications in analysing reviews on ecommerce websites and display for future customers; in analysing reviews, customer feedback and/or marketing verbatim and develop new products or features for upcoming products; analysing reviews, customer feedback and/or marketing verbatim and use for social media content, advertising and/or marketing; analysing reviews, customer feedback and/or marketing verbatim and use the analysis to determine where gaps existing in understanding the customer feedback and further collect feedback to fill the existing gaps; analysing customer feedback from emails or social media and take action like responding correctly, escalating the severity; analysing customer feedback from emails or social media to understand new and upcoming trends and what users are talking about; and the like.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The exemplary embodiment was chosen and described in order to best explain the principles of the present disclosure and its practical application, to thereby enable others skilled in the art to best utilize the present disclosure and various embodiments with various modifications as are suited to the particular use contemplated.

What is claimed is:

1. A method for determining sentiment of natural language text content in a domain independent manner, the method comprising:
   providing an adjective-polarity database having stored therein a list of adjectives and a polarity value associated with each of the adjectives;
   receiving tagged natural language text content related to a first domain with information about corresponding sentiment associated therewith;
   identifying nouns and adjectives in the received tagged natural language text content;
   associating the polarity value to each of the adjectives identified in the received tagged natural language text content based on the polarity value associated with the corresponding adjective in the adjective-polarity database;
   masking the identified nouns and adjectives in the received tagged natural language text content with part-of-speech tags that include information about the associated polarity values for at least the identified adjectives; and
   utilizing the masked natural language text content with information about corresponding sentiment for training of an aspect based sentiment analysis model to be implemented for determining a sentiment score for natural language text content related to a second domain that is independent of the first domain.

2. The method of claim 1, wherein the received tagged natural language text content comprises user reviews related to the first domain with information about corresponding one or more aspects of the first domain.

3. The method of claim 2 further comprising categorizing each of the identified nouns in the received tagged natural language text content in a first class of nouns if the identified noun corresponds to the one or more aspects related to the first domain for which the sentiment scores are to be determined and in a second class of nouns otherwise.

4. The method of claim 1 further comprising assigning the polarity value for at least one adjective identified in the received tagged natural language text content by:
   identifying at least a predefined number of other available tagged natural language text content having the same at least one adjective;
   determining the sentiment scores for each of the identified other available tagged natural language text content;
   calculating an average value of the determined sentiment scores of the identified other available tagged natural language text; and
   assigning the calculated average value of the sentiment scores as the polarity value for the at least one adjective.

5. The method of claim 1 further comprising triggering a user interface to receive an input from a user to assign the polarity value for at least one adjective identified in the received tagged natural language text content.

6. The method of claim 1, wherein the adjective-polarity database comprises five categories of classes of the polarity values, with each of the adjectives in the list of adjectives stored therein being assigned to at least one of the five categories of classes of the polarity values.

7. The method of claim 1, wherein the adjectives and the corresponding polarity values in the adjective-polarity database are aspect dependent.

8. The method of claim 1 further comprising determining and utilizing syntactic relationship between terms in the received tagged natural language text content to identify the nouns and the adjectives therein.

9. The method of claim 1 further comprising implementing the trained aspect based sentiment analysis model to determine the sentiment score for natural language text content related to the second domain.

10. A system for determining sentiment of natural language text content in a domain independent manner, comprising:
    a data repository having stored therein tagged natural language text content related to a first domain with information about corresponding sentiment associated therewith;
    an adjective-polarity database having stored therein a list of adjectives and a polarity value associated with each of the adjectives;
    a processing unit comprising an identifier module and an adjective-polarity module; and
    a memory device coupled to the data repository, the adjective-polarity module and the processing unit, the memory device having instructions stored thereon that, in response to execution by the processing unit, cause the processing unit to perform operations comprising:
       receiving the tagged natural language text from the data repository;
       identifying, via the identifier module, nouns and adjectives in the received tagged natural language text content;
       associating, via the adjective-polarity module, the polarity value to each of the adjectives identified in the received tagged natural language text content based on the polarity value associated with the corresponding adjective in the adjective-polarity database;
       masking, via the identifier module, the identified nouns and adjectives in the received tagged natural language text content with part-of-speech tags that include information about the associated polarity values for at least the identified adjectives; and
       utilizing the masked natural language text content with information about corresponding sentiment for training of an aspect based sentiment analysis model to be implemented for determining a sentiment score for natural language text content related to a second domain that is independent of the first domain.

11. The system of claim 10, wherein the tagged natural language text content stored in the data repository comprises user reviews related to the first domain with information about corresponding one or more aspects of the first domain.

12. The system of claim 11, wherein the processing unit is further caused to categorize, via the identifier module, each of the identified nouns in the received tagged natural language text content in a first class of nouns if the identified noun corresponds to the one or more aspects related to the first domain for which the sentiment scores are to be determined and in a second class of nouns otherwise.

13. The system of claim 10, wherein the processing unit is further configured to assign, via the adjective-polarity module, the polarity value for at least one adjective identified in the received tagged natural language text content by:
   identifying at least a predefined number of other available tagged natural language text content having the same at least one adjective;
   determining the sentiment scores for each of the identified other available tagged natural language text content;
   calculating an average value of the determined sentiment scores of the identified other available tagged natural language text; and
   assigning the calculated average value of the sentiment scores as the polarity value for the at least one adjective.

14. The system of claim 10, wherein the processing unit is further configured to trigger, via the adjective-polarity module, a user interface to receive an input from a user to assign a polarity value for at least one adjective identified in the received tagged natural language text content.

15. The system of claim 10, wherein the adjective-polarity database comprises five categories of classes of the polarity values, with each of the adjectives in the list of adjectives stored therein being assigned to at least one of the five categories of classes of the polarity values.

16. The system of claim 10, wherein the adjectives and the corresponding polarity values in the adjective-polarity database are aspect dependent.

17. The system of claim 10, wherein the processing unit is further configured to determine, via the identifier module, and utilize syntactic relationship between terms in the received tagged natural language text content to identify nouns and adjectives therein.

18. The system of claim 10, wherein the processing unit is further caused to implement the trained aspect based sentiment analysis model to determine the sentiment score for natural language text content related to the second domain.

* * * * *